(12) United States Patent  
Yamakawa

(10) Patent No.: US 10,577,212 B2
(45) Date of Patent: Mar. 3, 2020

(54) INFORMATION PROCESSING APPARATUS FOR CONTROLLING EXECUTION OF PRINT JOB IN WHICH POST-PROCESSING IS DESIGNATED

(71) Applicant: CANON KABUSHIKI KAISHA, Tokyo (JP)

(72) Inventor: Junichi Yamakawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 15/807,432

(22) Filed: Nov. 8, 2017

(65) Prior Publication Data
US 2018/0134509 A1 May 17, 2018

(30) Foreign Application Priority Data

Nov. 11, 2016 (JP) ................. 2016-220401

(51) Int. Cl.
*B65H 35/00* (2006.01)
*B65H 37/00* (2006.01)
(Continued)

(52) U.S. Cl.
CPC ............. *B65H 29/60* (2013.01); *B65H 43/00* (2013.01); *B65H 43/06* (2013.01); *G03G 15/5083* (2013.01); *G03G 15/55* (2013.01); *G03G 15/6552* (2013.01); *G06F 3/1204* (2013.01); *G06F 3/1207* (2013.01); *G06F 3/1259* (2013.01); *G06F 3/1264* (2013.01); *G06F 3/1285* (2013.01); *B65H 2511/51* (2013.01); *B65H 2511/515* (2013.01); *B65H 2551/20* (2013.01); *B65H 2801/06* (2013.01);
(Continued)

(58) Field of Classification Search
CPC ........ B65H 35/00–10; B65H 37/00–04; B65H 43/06; B65H 45/00–30; G03G 15/00; G03G 15/6552; G03G 21/00; G03G 21/14
See application file for complete search history.

(56) References Cited

U.S. PATENT DOCUMENTS

2016/0039627 A1  2/2016  Maeda
2017/0344315 A1* 11/2017  Strub ............... G05B 19/41845

FOREIGN PATENT DOCUMENTS

JP      2008224724 A  *  9/2008  .............. B62J 17/04
JP      2010277324 A  * 12/2010  .............. B41J 29/38

* cited by examiner

*Primary Examiner* — Nguyen Q. Ha
(74) *Attorney, Agent, or Firm* — Canon U.S.A., Inc. IP Division

(57) ABSTRACT

An information processing apparatus that transmits a print job to an image forming apparatus configured to start print processing upon receiving a print job even in a state where a post-processing device corresponding to post-processing designated in the print job is not mounted on a post-processing apparatus. The information processing apparatus is configured to receive information about the post-processing device from the image forming apparatus, transmit based on the received information the print job to the image forming apparatus when determining that the post-processing device corresponding to the post-processing designated in the print job is mounted on the post-processing apparatus, and not to transmit the print job to the image forming apparatus when determining that the post-processing device corresponding to the post-processing designated in the print job is not mounted on the post-processing apparatus.

10 Claims, 14 Drawing Sheets

(51) Int. Cl.
*B65H 45/00* (2006.01)
*G03G 15/00* (2006.01)
*G03G 21/00* (2006.01)
*G03G 21/14* (2006.01)
*B65H 29/60* (2006.01)
*G06F 3/12* (2006.01)
*B65H 43/00* (2006.01)
*B65H 43/06* (2006.01)

(52) U.S. Cl.
CPC ..... *B65H 2801/27* (2013.01); *G03G 15/6582* (2013.01); *G03G 2215/00603* (2013.01); *G03G 2221/16* (2013.01)

INFORMATION PROCESSING APPARATUS FOR CONTROLLING EXECUTION OF PRINT JOB IN WHICH POST-PROCESSING IS DESIGNATED

BACKGROUND OF THE INVENTION

Field of the Invention

The present disclosure relates to an information processing apparatus for controlling execution of a print job that performs post-processing on a sheet.

Description of the Related Art

A post-processing apparatus for performing punching processing as post-processing on a sheet discharged from an image forming apparatus has been heretofore known (US2016/0039627). This post-processing apparatus is capable of executing various types of punching processing when a plurality of punch dies having different shapes of punch holes or having a different number of punch holes are selectively mounted on the post-processing apparatus. A post-processing apparatus capable of executing processing of creasing a sheet when a crease die is mounted, in place of a punch die, on the post-processing apparatus is also known.

However, in such an image forming system to which the post-processing is connected, a following issue arises due to replaceability of the die.

A crease function can be performed when a crease die is mounted on a puncher. However, the die can be replaced by a user any time, so that when a print job involving crease processing is executed, the crease die mounted on the puncher may have been replaced with a punch die. A similar issue may occur with punching. For example, when an image forming apparatus receives a job in which saddle book binding and crease processing are designated but a punch die is mounted on the image forming apparatus, the saddle book binding is carried out but the crease processing is not performed if the current state continues. Thus a desired output cannot be obtained.

SUMMARY OF THE INVENTION

The present disclosure provides a mechanism for preventing discharge of a sheet on which designated post-processing has not been performed in a state where a post-processing device different from the post-processing device designated for the post-processing is mounted on a post-processing apparatus.

According to a first aspect of the embodiments, there is provided an information processing apparatus that transmits a print job to an image forming apparatus connected to a post-processing apparatus, the post-processing apparatus being capable of mounting an replaceable post-processing device, the image forming apparatus being configured to start print processing upon receiving a print job even in a state where a post-processing device corresponding to post-processing designated in the print job is not mounted on the post-processing apparatus, the information processing apparatus including a receiver configured to receive information about the post-processing device from the image forming apparatus, and a controller configured to transmit the print job to the image forming apparatus when the controller determines, based on the information received by the receiver, that the post-processing device corresponding to the post-processing designated in the print job is mounted on the post-processing apparatus, and configured not to transmit the print job to the image forming apparatus when the controller determines, based on the information received by the receiver, that the post-processing device corresponding to the post-processing designated in the print job is not mounted on the post-processing apparatus.

Further features of the disclosure will become apparent from the following description of exemplary embodiments with reference to the attached drawings.

DESCRIPTION OF THE EMBODIMENTS

Next, exemplary modes for carrying out the present invention will be described with reference to the drawings.
<Description of System Configuration>
<System Configuration>

Figure 1:
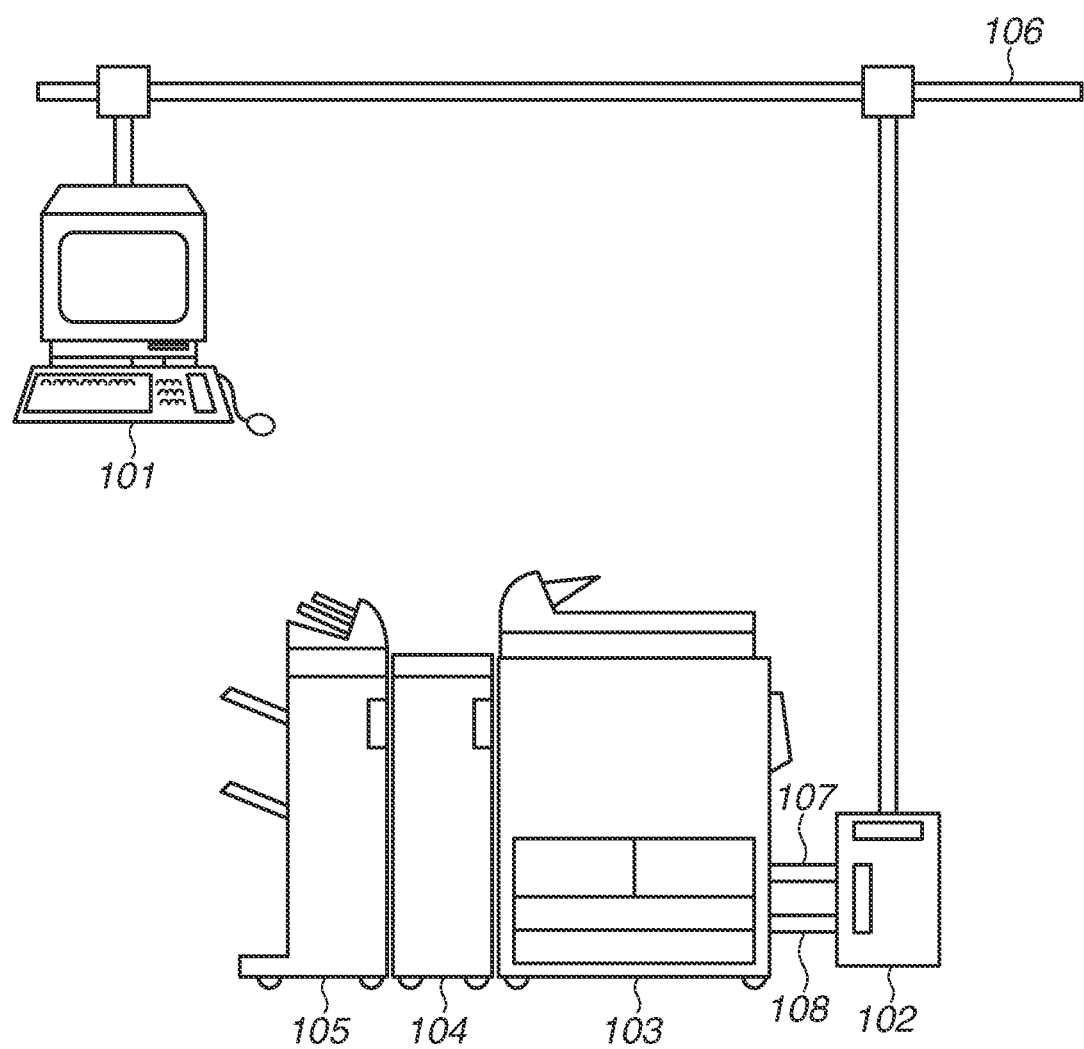
FIG. 1 is a diagram illustrating a configuration of a printing system including an image forming apparatus.

A first exemplary embodiment will be described below. FIG. 1 is a diagram illustrating a configuration of a printing system according to the present exemplary embodiment. This embodiment illustrates an example of a system that communicates with a client computer (PC) 101, which is a data processing apparatus, through an information processing apparatus 102 which is connected to an image forming apparatus 103. The printing system illustrated in the present exemplary embodiment includes an image forming apparatus that executes different post-processing on a sheet having an image formed thereon by exchanging post-processing devices. Further, the printing system illustrated in the present exemplary embodiment includes a PDL controller 102, which is described below, as an information processing apparatus that communicates with the image forming apparatus.

Referring to FIG. 1, the client computer (hereinafter referred to as a PC) 101 executes an application instructed by a user, and generates print information (PDL data) based on a predetermined page description language.

The PDL controller 102, which is an information processing apparatus, analyzes PDL data received from the PC 101 via a network 106 which is composed of, for example, an Ethernet® cable, and is configured to output a job that can be processed by the image forming apparatus 103, to the image forming apparatus 103. The image forming apparatus 103 is provided with an image scanner and an automatic document feeder so that the image forming apparatus 103 can be used as a printer as well as a copying apparatus.

A post-processing apparatus 104 is an apparatus for performing post-processing with respect to each sheet discharged from the image forming apparatus 103. A finisher 105 is connected to a downstream side of the post-processing apparatus 104, and performs processing such as stapling, shifting, and saddle stitching bookbinding, on a sheet bundle discharged from the image forming apparatus 103.

The PC 101 and the PDL controller 102 are connected to the network 106. The PDL controller 102 bidirectionally exchanges control signals related to printing of PDL data with the image forming apparatus 103 through a cable 107. Further, the PDL controller 102 exchanges image information (video signals) with the image forming apparatus 103 through an image transfer video cable 108.

<Configuration of Printing Apparatus and PDL Controller>

Figure 2:
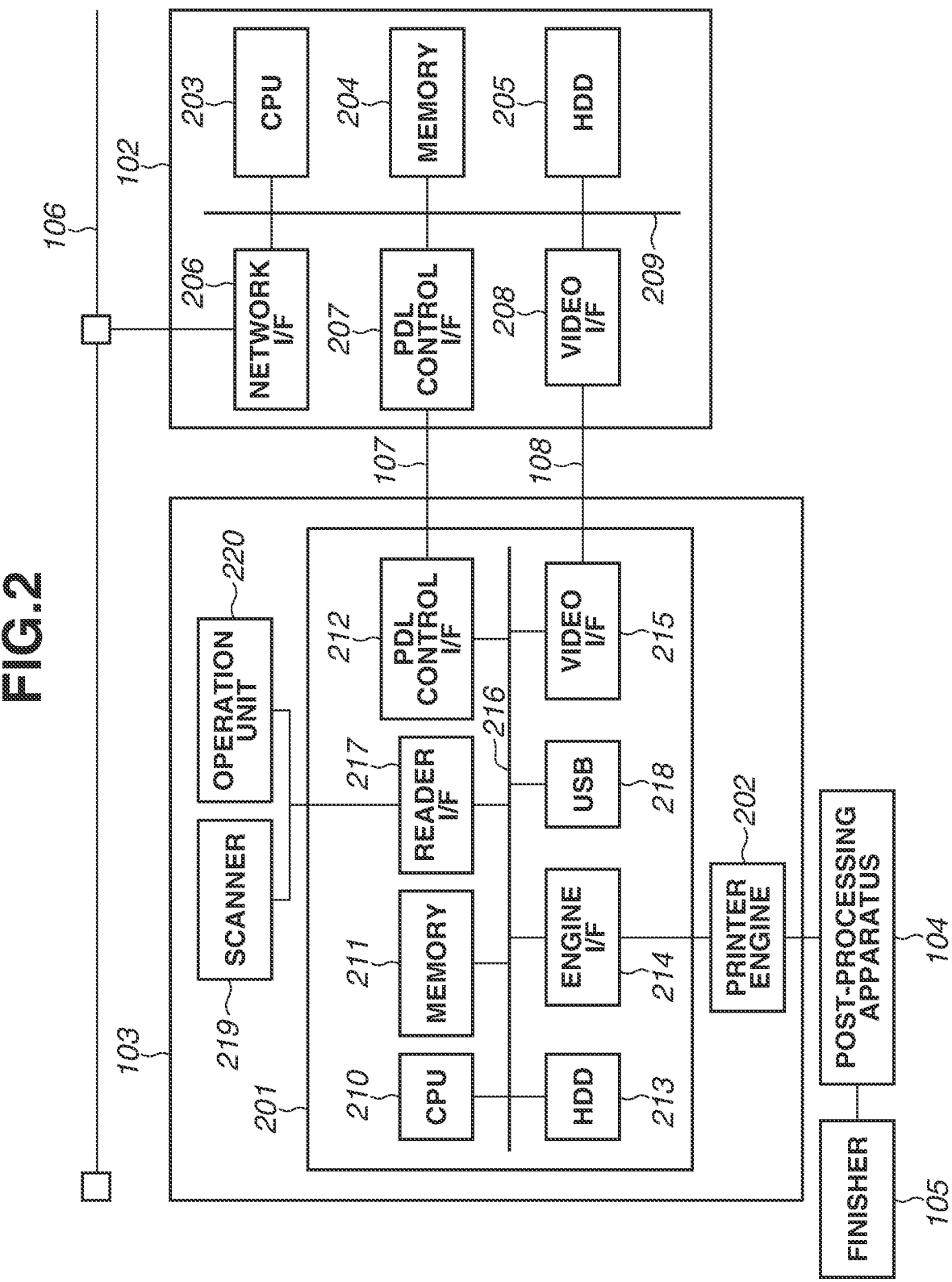
FIG. 2 is a block diagram illustrating the configuration of the printing system.

FIG. 2 is a block diagram illustrating the configuration of the printing system illustrated in FIG. 1. In the printing system illustrated in the present exemplary embodiment, the image forming apparatus 103 includes a controller 201, a printer engine 202, a scanner 219, and an operation unit 220. Details of each component will be described below.

In the PDL controller 102, a CPU 203 controls each unit of the PDL controller through a system bus 209, carries out calculation, and executes programs stored in a storage device. A memory 204 is used as a temporary storage area and a work memory in image development of PDL data. A hard disk drive HDD 205 is a mass storage device, and stores various control programs to be executed by the CPU 203. The hard disk drive HDD 205 is also used as a temporary storage area and a save area for data to be processed.

A network interface 206 communicates with other devices such as the PC 101, via the network 106. A PDL control interface 207, which is also a network interface similar to the network interface 206, performs control of PDL print processing, and transmits a control command to the image forming apparatus 103 or receives a control command therefrom.

In the controller 201, the CPU 210 controls each unit of the image forming apparatus via a system bus 216, carries out calculation, and executes programs stored in a storage device. A memory 211 is used as a temporary storage area and a work memory in an operation of a printing apparatus. A hard disk drive (HDD) 213 is a mass storage device and stores various control programs to be executed by the CPU 210. The HDD 213 is also used as a temporary storage area and a save area for data to be processed.

A PDL control interface 212 processes the PDL data received from the PDL controller 102, and transmits a control command to the PDL controller 102 or receives a control command therefrom.

An engine interface (engine I/F) 214 manages control of communication with the printer engine 202. The printer engine 202 are connected to the post-processing apparatus 104 and the finisher 105 via dedicated cables. A reader interface 217 connects the scanner 219 and the operation unit 220 to the controller 201 via the system bus 216.

<Configuration of Software Module>

Figure 3:
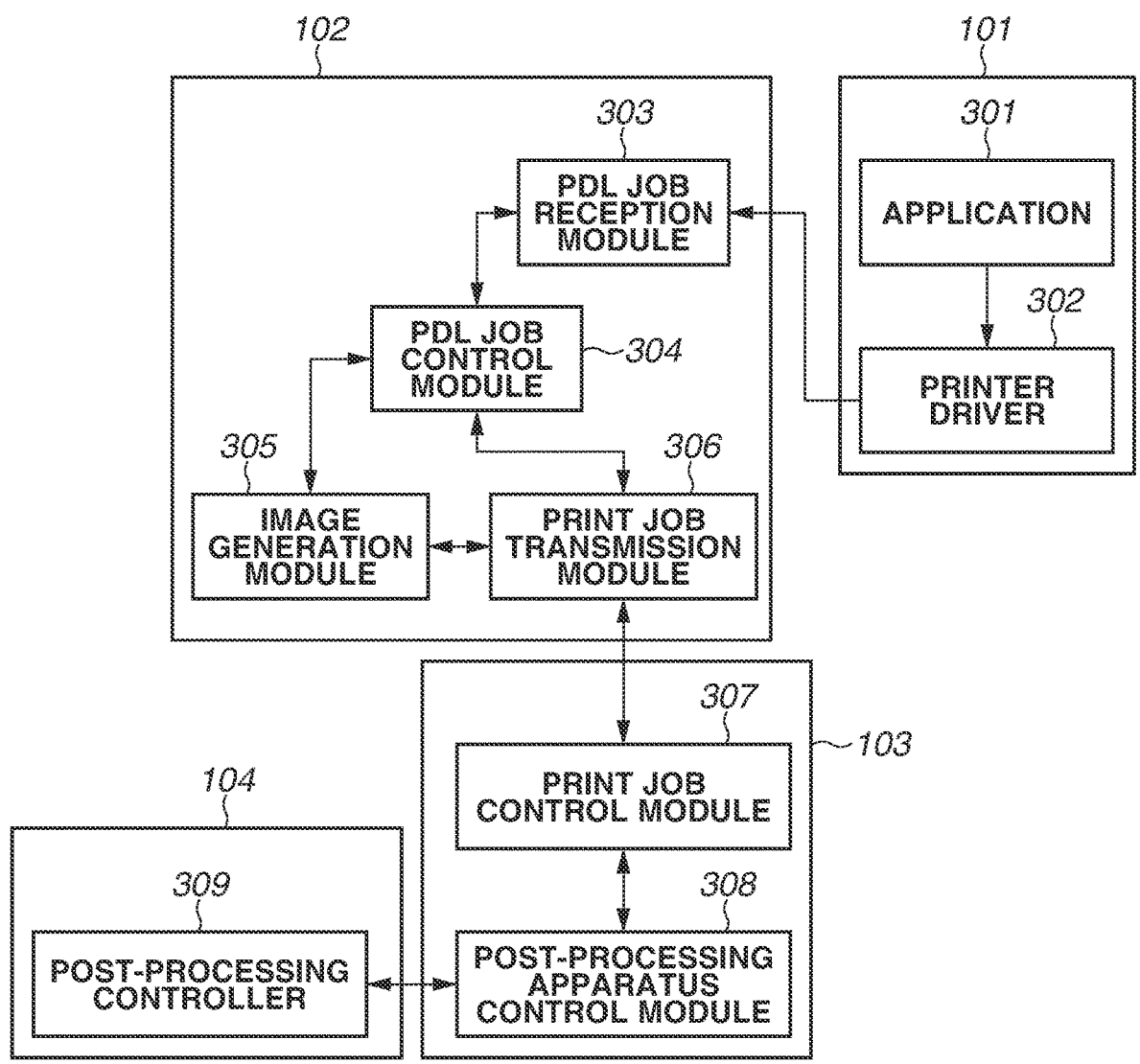
FIG. 3 is a diagram illustrating a module configuration of the printing system.

FIG. 3 is a block diagram illustrating software modules of the printing system illustrated in FIG. 2.

Referring to FIG. 3, an application 301 and a printer driver 302 are stored in a hard disk (not illustrated) within the PC 101, developed on a memory within the PC 101, and are executed by a CPU (not illustrated) within the PC 101. The PC 101 converts data created by the application 301 into PDL data via the printer driver 302, and transmits the PDL data to the PDL controller 102.

A PDL job reception module 303, a PDL job control module 304, an image generation module 305, and a print job transmission module 306 are developed on the memory 204 of the PDL controller 102, and invoked by a program and executed by the CPU 203.

The PDL job reception module 303 receives a PDL job transmitted from the PC 101. The PDL job control module 304 analyzes the PDL data of the received PDL job, and controls the PDL job.

The image generation module 305 generates image data by developing the PDL data. The print job transmission module 306 transmits image data generated by the image generation module 305 to the image forming apparatus 103 based on the result of analysis by the PDL job control module 304, and transmits a command to acquire equipment information about the image forming apparatus 103 and the post-processing apparatus 104. In this case, the equipment information obtained from the image forming apparatus 103 includes information about a post-processing member (die member (a crease die or a punch die)) for performing sheet post processing.

A print job control module 307 is developed on the memory 211 of the printing apparatus 103, and is invoked by a program and executed by the CPU 210. The print job control module 307 transmits, to the printer engine 202, a command for controlling the printer engine with respect to the print image data and print job transmitted from the print job transmission unit 306, and an equipment information acquisition command through the engine I/F 214, and sends a reply to an equipment information acquisition request.

A post-processing apparatus control module 308 is developed on the memory (not illustrated) within the print engine 202, and is invoked by a program and executed by the CPU (not illustrated).

The post-processing apparatus control module 308 transmits a post-processing command to the post-processing controller 309 based on a control command from the print job control module 307, receives die information about the post-processing apparatus 104 and a state notification about the apparatus, and notifies the print job control module 307 of the received information. The post-processing control unit 309 executes the post-processing and notifies the post-processing apparatus control module 308 of a state of the post-processing apparatus 104, such as a die state or an open/close state of a door.

Each of the modules described above may be composed of hardware such as a CPU, an IC, an ASIC, or an electric circuit.

<Post-Processing Apparatus>

Figure 4:
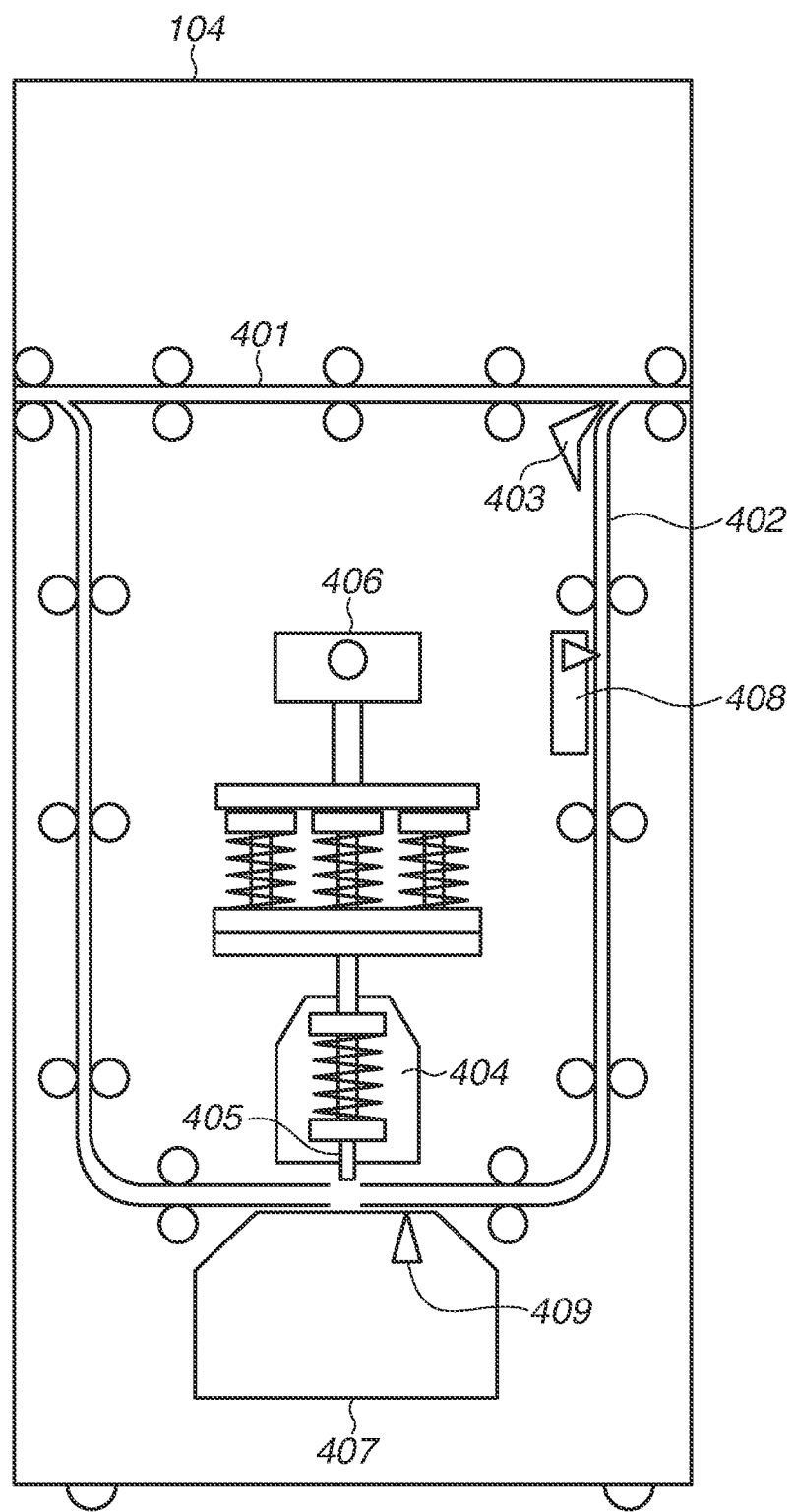
FIG. 4 is a sectional view illustrating a configuration of a post-processing apparatus.

FIG. 4 is a sectional view illustrating the configuration of the post-processing apparatus 104 illustrated in FIG. 1. The post-processing apparatus 104 can execute punching processing and crease processing on a sheet discharged from the image forming apparatus 103, by using a post-processing device that is mounted on the post-processing apparatus 104 in a replaceable.

Referring to FIG. 4, a straight path 401 is a path for conveying the sheet which requires no post-processing. The sheet is conveyed from an upstream apparatus (image forming apparatus 103) to a downstream side.

A conveyance path 402 is a conveyance path for conveying each sheet to be subjected to post-processing. A flapper 403 sorts the sheets conveyed from the image forming apparatus 103 into the straight path 401 or the conveyance path 402. The flapper 403 is configured to swing around a swing axis, and defines a sheet conveyance direction. When the flapper 403 swings clockwise in the figure, the sheets are conveyed to the straight path 401. When the flapper 403 swings counterclockwise in the figure, the sheets are conveyed to the conveyance path 402.

A post-processing die 404, which is a post-processing device, is a die for performing post-processing on a sheet, and includes a blade 405 for performing post-processing. In the present exemplary embodiment, the post-processing die 404 refers to two types of dies, i.e., a crease die and a punch die. The shape of the blade 405 varies depending on the type of the die. For example, when the crease die is used, the blade 405 is a rounded blade because a sheet is not cut with the blade. When the punch die is used, a plurality of blades 405 for forming punch holes is disposed in series.

The post-processing die 404 can be detachably mounted on the post-processing apparatus 104, and uses a sensor (not illustrated) to detect whether the post-processing die 404 is mounted on the post-processing apparatus 104. The die is also provided with a memory (not illustrated) which stores data representing the type of the die. The post-processing apparatus 104 reads information from the memory of the die, identifies the type of the mounted die, and notifies the image forming apparatus 103 of the type of the die. There is a plurality of types of punch dies depending on the type of the hole. In a case where the punch die is mounted, the post-processing apparatus 104 notifies the image forming apparatus 103 also of the type of the punch die. A pressure device 406 is a device for applying a pressure to the post-processing die 404. A base 407 is a base that receives the blade 405. A conveyance speed control unit 408 is a unit that controls the sheet conveyance speed so that a sheet is conveyed at a specific speed. A conveyance speed control unit 408 includes a sensor for detecting the sheet conveyance speed. A detection sensor 409 is a sensor for detecting a leading edge of a sheet being conveyed.

When the post-processing apparatus 104 performs post-processing on a sheet, the following operation is carried out. First, the conveyance speed control unit 408 includes a sensor for detecting the sheet conveyance speed, and accelerates or decelerates the conveyance speed of the sheet passing through the conveyance path 402 to a specific speed. When the leading edge of the sheet conveyed at the specific speed is detected by the detection sensor 409, the pressure device 406 applies a pressure to the post-processing die 404 in a direction from top to bottom in the figure.

The pressure applied by the pressure device 406 to the post-processing die 404 is transmitted to the blade 405. The blade 405 moves in a direction from top to bottom in the figure, and the blade 405 and the base 407 sandwich each sheet to perform post-processing, such as creasing and punching, on the sheet.

<Print of Crease Setting Job>

A crease setting job will be described with reference to FIGS. 5 to 7.

Figure 5:
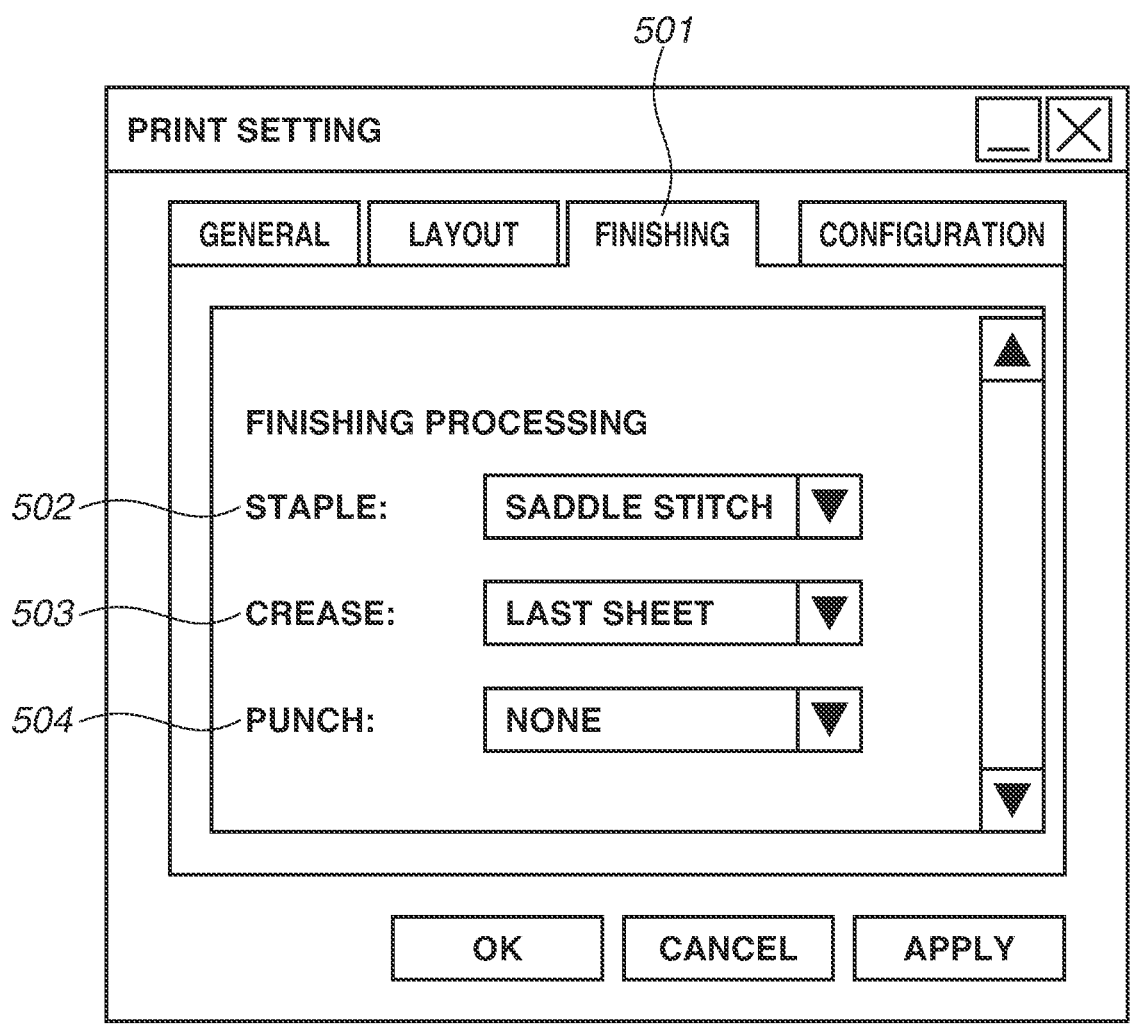
FIG. 5 is a diagram illustrating a UI screen displayed on a PC.

FIG. 5 is a diagram illustrating a UI screen displayed on the PC 101 illustrated in FIG. 1. In the present exemplary embodiment, the printer driver 302 installed on the PC 101 performs control to display a print setting screen.

Referring to FIG. 5, a finishing tab 501 is selected when a finishing setting is made. A staple 502 sets a binding method for stapling performed in the finisher 105. In the present case, "saddle stick" is set. A crease 503 indicates that a "last sheet" is set as a sheet on which crease processing is carried out. A punch 504 indicates that the presence or absence of punching processing is set. In this example, "none" is set for punching processing. When the print setting is determined, the application 301 on the PC 101 transmits the print job in which crease processing is set to the PDL controller 102 from the printer driver 302.

Figure 6:
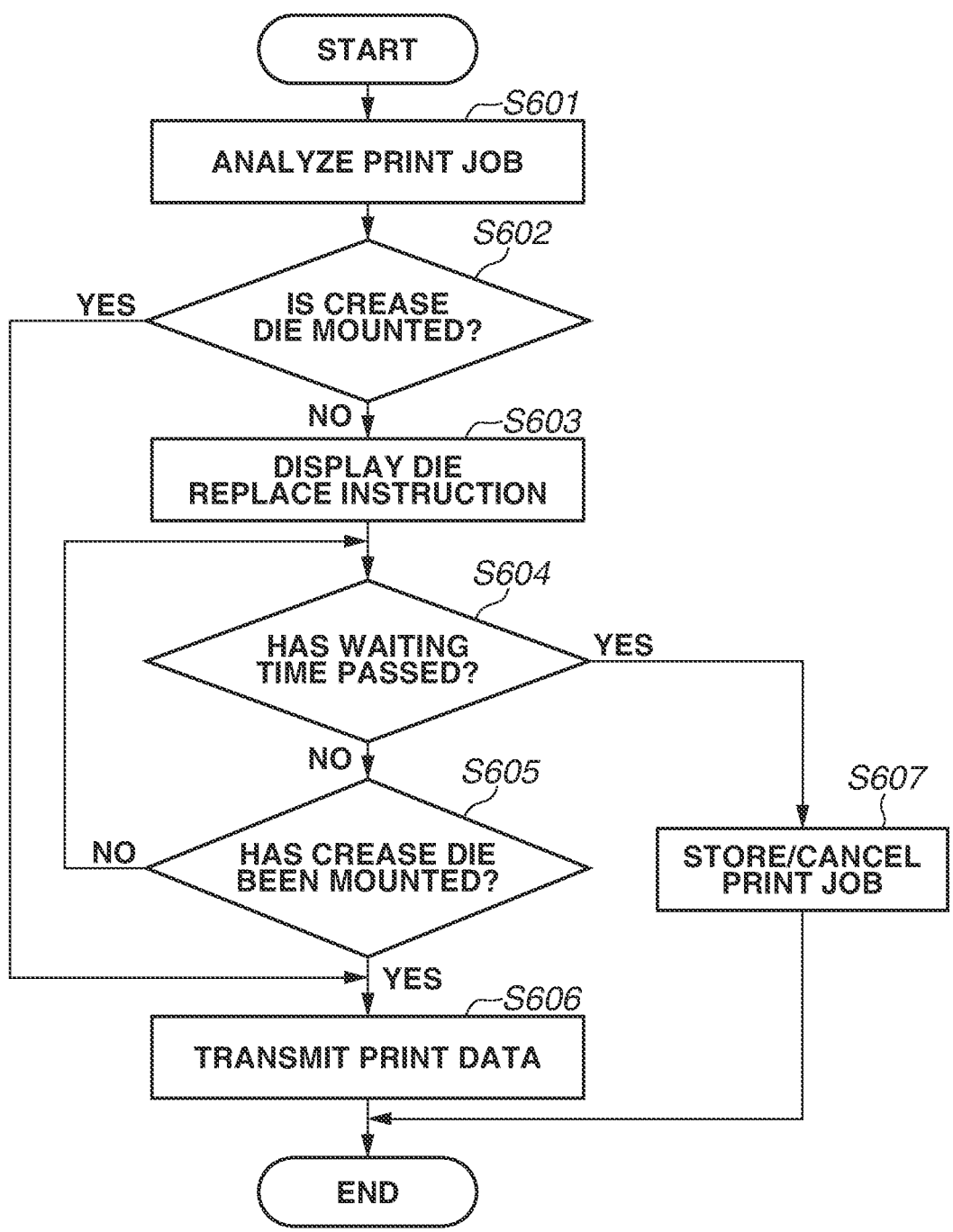
FIG. 6 is a flowchart illustrating a control method of an information processing apparatus.

FIG. 6 is a flowchart illustrating processing executed by the CPU 203 of the PDL controller 102. The present exemplary embodiment illustrates processing performed when the PDL controller 102 receives the print job in which crease processing is set from the application 301 installed on the PC 101. Each step is implemented in such a manner that the CPU 203 of the PDL controller 102 executes the stored control programs.

The processing is started when the PDL controller 102 receives the print job. In step S601, the PDL job control module 304 analyzes the print job received by the PDL reception module 303. In step S602, the PDL job control module 304 determines whether the type (post-processing condition) of the die mounted on the post-processing apparatus 104 is the crease die specified in the print job.

The PDL job control module 304 obtains the die information about the post-processing apparatus 104 from the image forming apparatus 103 through the print job transmission module 306, and the PDL job control unit 304 retains the information in the memory 204.

Upon receiving the print job which specifies the post-processing performed by the post-processing apparatus 104 using a die, the image forming apparatus according to the present exemplary embodiment executes the print job even in a state where the die member corresponding to the post-processing specified in the print job is not mounted on the post-processing apparatus 104. In other words, a sheet having an image formed thereon is discharged without executing the specified post-processing on the sheet.

Figure 14:
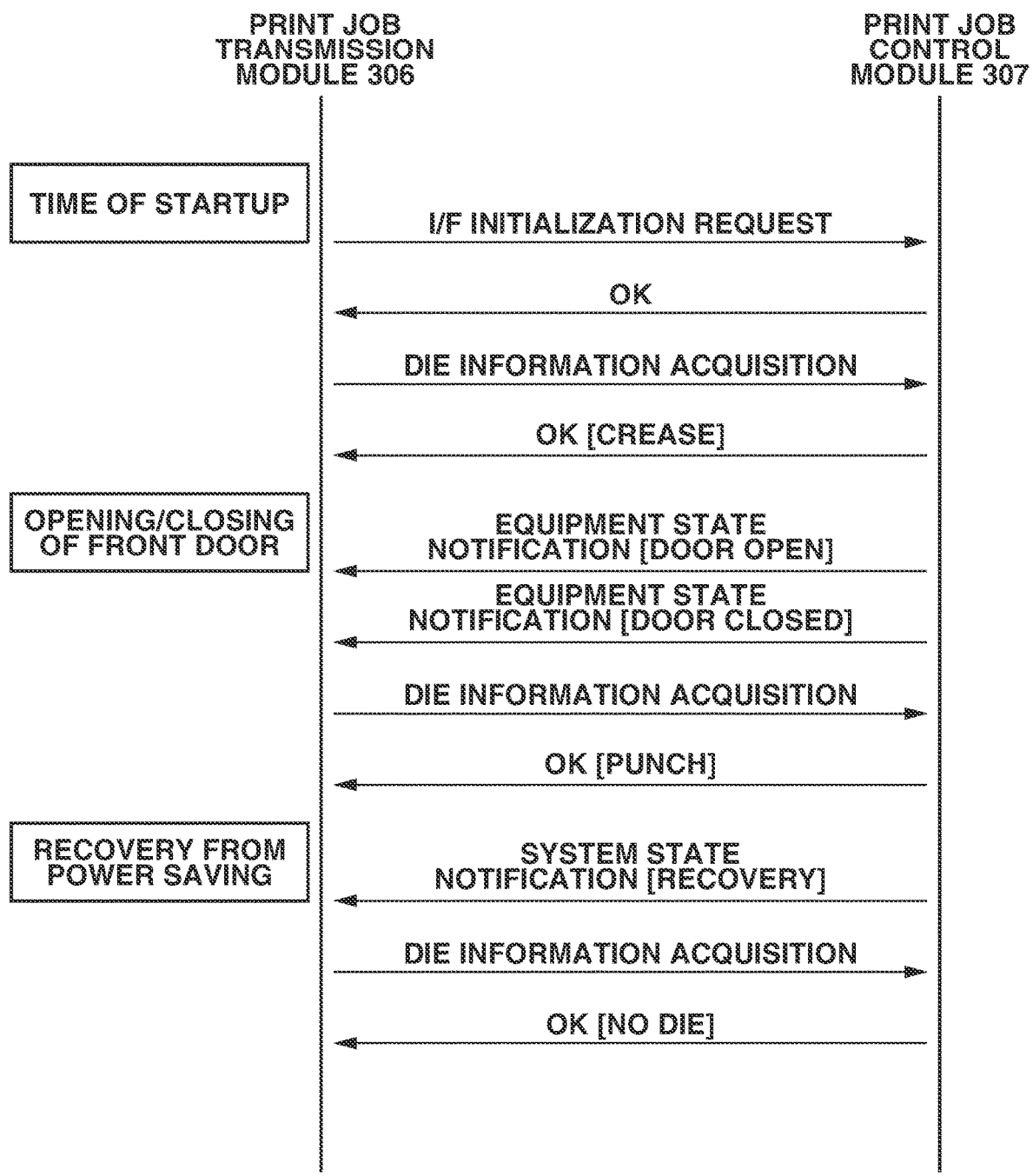
FIG. 14 is a diagram illustrating communication processing of the printing system.

FIG. 14 is a diagram illustrating communication processing between the PDL controller 102 and the image forming apparatus 103. Die information acquisition processing of the post-processing apparatus 104 of the PDL controller 102 will be described in detail below with reference to a communication example illustrated in FIG. 14.

FIG. 14 illustrates exchange between the command transmission/reception of the print job transmission module 306 of the PDL controller 102 and the command transmission/reception of the print job control module 307 of the image forming apparatus 103.

(1) At Time of Startup of PDL Controller 102

To initialize the interface, the print job transmission module 306 transmits an "I/F initialization request" to the print job control module. Upon receiving "OK" from the print job control module 307, the print job transmission module 306 transmits a "die information acquisition request" to the print job control module 307. Upon receiving the "die information acquisition request", the print job control module 307 notifies the print job transmission module 306 of "OK" including the die information. The notified die information is stored in the memory 204. Examples of the die information include "no die", "punch", and "crease". As for "punch", information about the type of punching is also added.

(2) When the Front Door of the Post-Processing Apparatus 104 is Opened or Closed When the front door of the post-processing apparatus 104 is opened, the print job control module 307 transmits an "equipment state notification" to the print job transmission module 306, and notifies the print job transmission module 306 that the front door is opened. When the front door of the post-processing apparatus 104 is closed, the print job control module 307 transmits the "equipment state notification" to the print job transmission module 306, and notifies the print job transmission module 306 that the front door is closed. Upon receiving the notifications, the print job transmission module 306 transmits the "die information acquisition request" to the print job control module 307. Upon receiving "OK" including the die information from the print job control module 307, the print job transmission module 306 updates the die information stored in the memory 204.

(3) When the Image Forming Apparatus 103 has Recovered from a Power Saving State (Sleep Mode)

When the image forming apparatus 103 has recovered from the power saving state, the print job control module 307 notifies the print job transmission module 306 of a "system state notification". Upon receiving the "system state notification", the print job transmission module 306 transmits the "die information acquisition request" to the print job control module 307 if the transmission has been made because of a recovery from the power saving state. Upon receiving "OK" including the die information from the print job control module 307, the print job transmission module 306 updates the die information stored in the memory 204.

When the die mounted on the post-processing apparatus 104 is the crease die, in step S606, the print job transmission module 306 transmits to the print job control module 307, the image data rasterized by the image generation module 305 based on the PDL data and the control command on the image forming apparatus 103. In step S606 of FIG. 6, both the rasterized image data and the control command for the image forming apparatus are referred to as print data.

Figure 7:
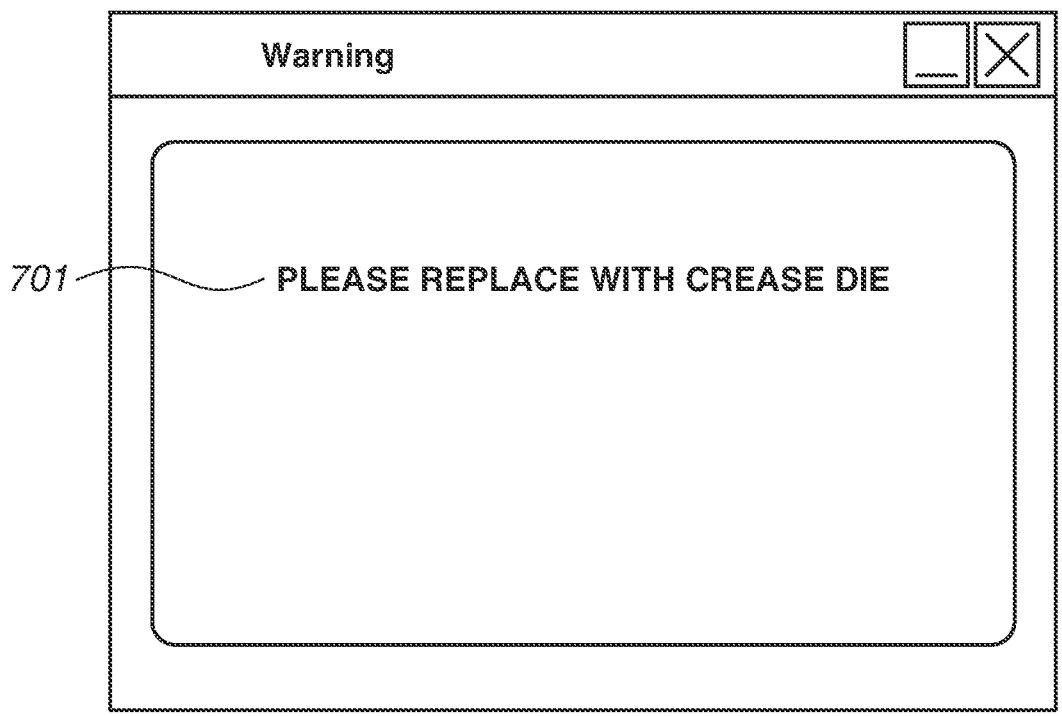
FIG. 7 is a diagram illustrating the UI screen displayed on the PC.

The UI screen illustrated in FIG. 7 is an example of an alarm message 701 displayed on the PC 101.

In step S602, if the PDL job control module 304 determines that the crease die is not mounted on the post-processing apparatus 104 (NO in step S602), the PDL job control module 304 notifies the PC 101 of the status of a "crease die replace instruction" in step S603. As illustrated in FIG. 7, the PC 101 displays, on the screen of the PC 101, the message 701 prompting to replace a die with the crease die. This message may also be displayed on the display of the image forming apparatus 103.

In step S604, the PDL job control module 304 determines whether a preliminarily set waiting time has passed after the notification in step S603. This waiting time can be set on an equipment setting screen of the PDL controller 102. The waiting time is five minutes by default.

In step S604, if the PDL job control module 304 determines that the waiting time has not passed (NO in step S604), the processing proceeds to step S605.

In step S605, the PDL job control module 304 determines whether the crease die has been mounted on the post-processing apparatus 104. If the PDL job control module 304 determines that the crease die has not been mounted (NO in step S605), the processing returns to step S604.

On the other hand, if the PDL job control module 304 determines in step S604 that the waiting time has passed (YES in step S604), the processing proceeds to S607. In step S607, the PDL job control module 304 stores the print job in the HDD 205 without transmitting the print job to the image forming apparatus 103, or cancels the print job, in accordance with a response (job cancel or not) from the PC 101, and then terminates the processing.

On the other hand, if the PDL job control module 304 determines in step S605 that the crease die has been mounted (YES in step S605), the processing proceeds to step S606. In step S606, the print job transmission module 306 transmits to the print job control module 307 of the image forming apparatus 103, the image data rasterized by the image generation module 305 based on the PDL data and the control command on the image forming apparatus 103, and then terminates the processing.

The print job control module 307 instructs the post-processing apparatus control module 308 to perform post-processing setting, and the post-processing apparatus control module 308 instructs the post-processing control unit 309 to perform crease processing. In other words, the print job and the crease processing based on the instructed post-processing setting are executed.

Also, in a case where the post-processing specified in the print job is punching processing and the punch die corresponding to the specified punching processing is not mounted on the post-processing apparatus 104, control processing similar to that described above is executed.

According to the first exemplary embodiment, when the PDL controller 102 receives the print job which designates post-processing, if the post-processing device corresponding to the designated post-processing is not mounted on the post-processing apparatus, the post-processing apparatus can be shifted to a state where the print job is cancelled or stored. Accordingly, in a case where an operation such as replacement of the post-processing device is not performed, even if the PDL controller 102 receives a print job from the PC 101, the PDL controller 102 does not transmit the print data according to the print job to the image forming apparatus 103. Therefore, a sheet having an image formed thereon can be prevented from being discharged without executing the designated post-processing on the sheet.

<Post-Processing Print Job Transmission Setting>

A second exemplary embodiment will be described below. In the second exemplary embodiment, how to deal with a print job when a die suitable for post-processing designated in a print job is not mounted on the post-processing apparatus 104 is preliminarily determined in equipment setting of the PDL controller 102. The control processing thereof will be described in detail below.

Figure 8:
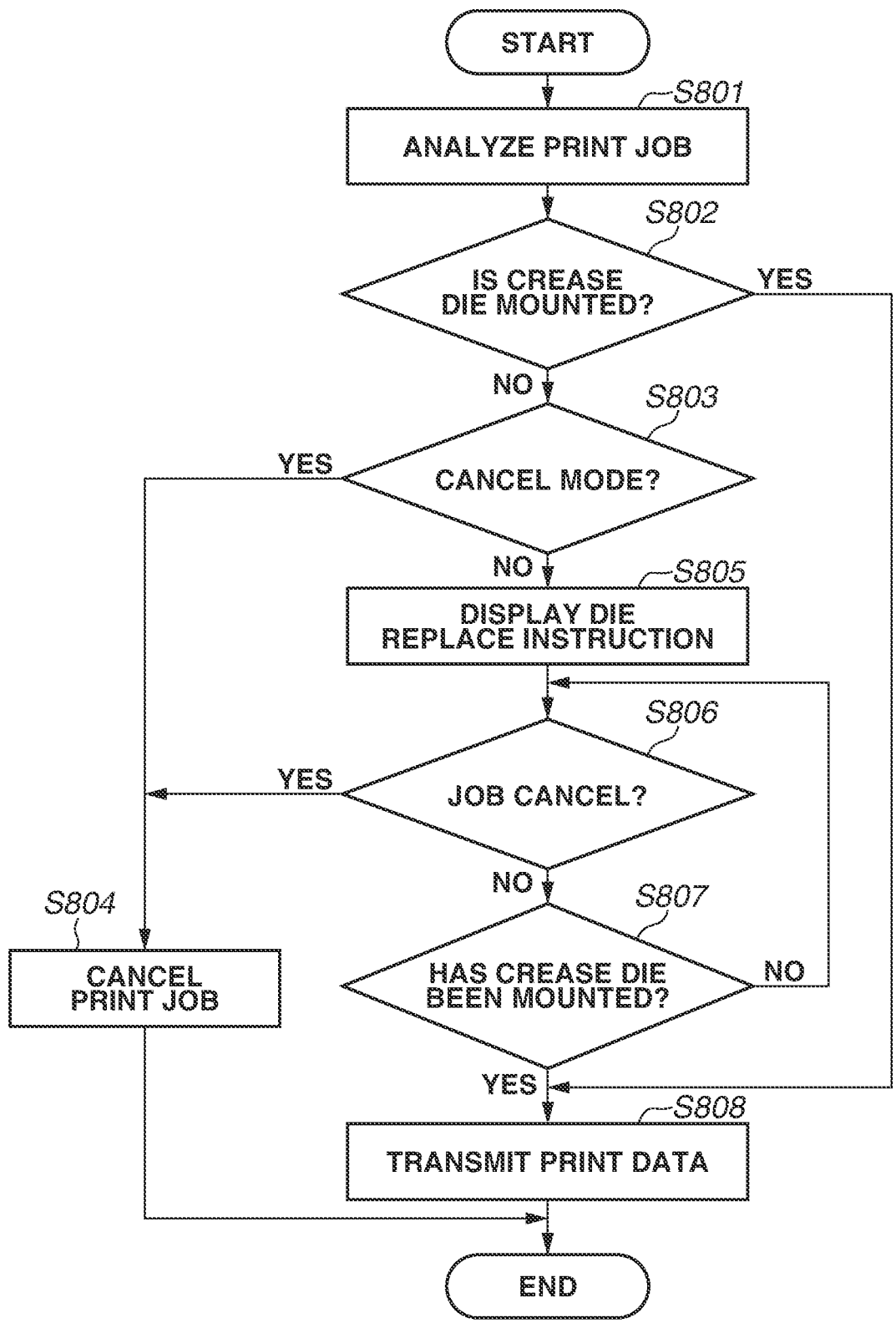
FIG. 8 is a flowchart illustrating the control method of the information processing apparatus.

FIG. 8 is a control flowchart executed by the PDL controller 102 according to the second exemplary embodiment. This example corresponds to processing performed when the PDL controller 102 receives the print job in which crease processing is set. Each step is implemented by the CPU 203 of the PDL controller 102 executing the stored control programs.

When the PDL controller 102 receives a print job set by the printer driver 302, in step S801, the PDL control module 304 analyzes the print job received by the PDL job reception module 303. In step S802, the PDL job control module 304 checks whether the type of the die mounted on the post-processing apparatus 104 is the crease die. The PDL job control module 304 obtains the die information about the post-processing apparatus from the image forming apparatus 103 at a timing similar to that in the first exemplary embodiment, and retains the die information in the memory 204.

If the PDL job control module 304 determines that the die mounted on the post-processing apparatus 104 is the crease die (YES in step S802), the processing proceeds to step S808. In step S808, the print job transmission module 306 transmits, to the print job control module 307 of the image forming apparatus 103, the image data rasterized by the image generation unit 305 based on the PDL data and the control command for the image forming apparatus 103, and then terminates the processing.

On the other hand, in step S802, if the PDL job control module 304 determines that the crease die is not mounted on the post-processing apparatus 104 (NO in step S802), the processing proceeds to step S803.

In step S803, the PDL job control module 304 checks information about a die non-mount setting mode. The die non-mount setting mode is a mode that is preliminarily set by the user on the equipment setting screen, and in this mode an operation to be executed is set when the die corresponding to the designated post-processing is not mounted on the post-processing apparatus. As the setting information, cancel of the print job, or standby for transmission of the print job until the die is replaced, is set. The former setting is referred to as a cancel mode, and the latter setting is referred to as a wait mode.

If the PDL job control module 304 determines in step S803 that the die non-mount mode is set as the "cancel mode" (YES in step S803), the processing proceeds to step S804.

In step S804, the PDL job control module 304 cancels the print job without transmitting the print job to the image forming apparatus 103, and then terminates the print processing. On the other hand, if the PDL job control module 304 determines in step S803 that the die non-mount mode is set as the "wait mode", the processing proceeds to step S805.

Figure 9:
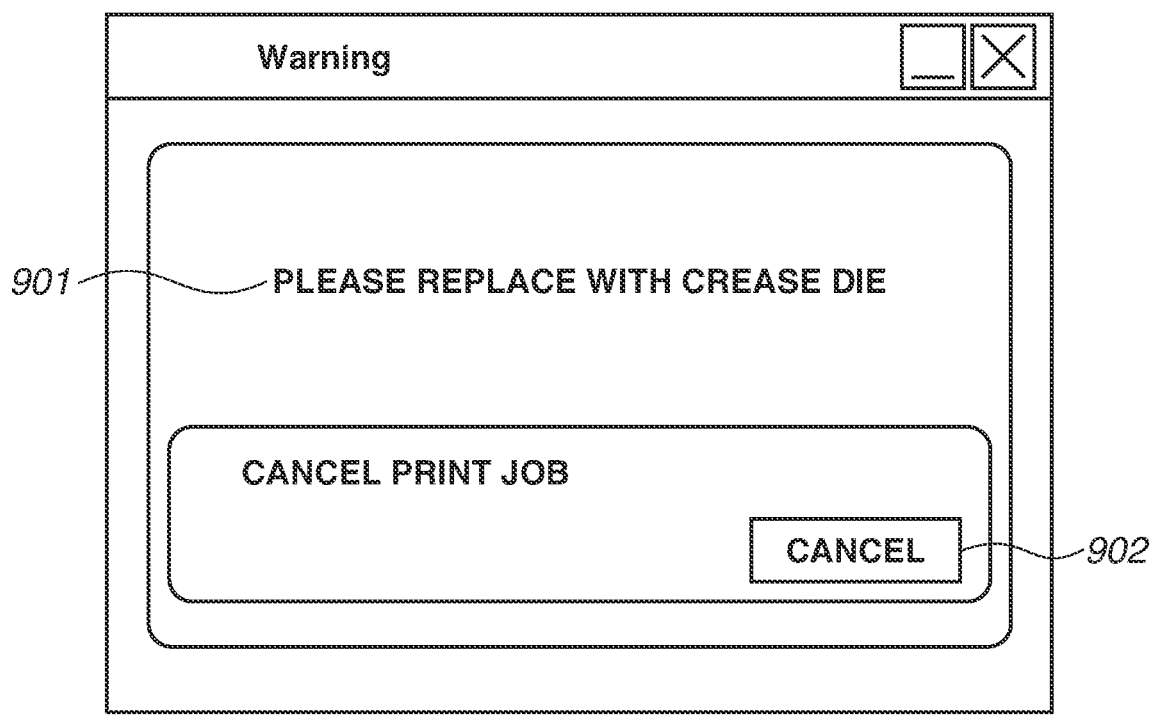
FIG. 9 is a diagram illustrating the UI screen displayed on the PC.

In step S805, the PDL job control module 304 notifies the PC 101 of the instruction displayed on the alarm screen illustrated in FIG. 9. The UI screen illustrated in FIG. 9 is an example illustrating an alarm message screen displayed on the PC 101. On this alarm screen, a message 901 prompting to replace a die with the crease die, and a cancel button 902 for cancelling the print job are displayed.

In step S805, the PDL job control module 304 notifies the PC 101 of the status of the "crease die replace instruction". Upon receiving this notification, the PC 101 displays the message 901 prompting to replace with the crease die on the display device. Next, the processing proceeds to step S806.

In step S806, the PDL job control module 304 determines whether the cancel instruction has been received, based on pressing of the cancel button 902, and when the cancel instruction is received, the processing proceeds to step S804.

On the other hand, in step S806, if the PDL job control module 304 has not received the cancel instruction (NO in step 806), the processing proceeds to S807.

In step S807, the PDL job control module 304 determines whether the crease die has been mounted based on communication with the post-processing apparatus 104. If the PDL job control module 304 determines that the crease die has not been mounted (NO in step S807), the processing returns to step S806.

On the other hand, if the PDL job control module 304 determines in step S807 that the crease die has been mounted, the processing proceeds to step S808.

In step S808, the print job transmission module 306 transmits, to the print job control module 307 of the image forming apparatus 103, the image data rasterized by the image generation module 305 based on the PDL data and the control command for the image forming apparatus, and then terminates the processing. In step S808 in FIG. 8, both the rasterized image data and the control command for the image forming apparatus 103 are referred to as print data.

After that, the print job control module 306 instructs the post-processing apparatus control module 308 to perform the post-processing setting, and the post-processing control unit 309 executes the crease processing based on the instructed post-processing setting, and outputs the processing result.

According to the second exemplary embodiment, the PDL controller 102 does not transmit the print job to the image forming apparatus 103 when the die corresponding to the post-processing designated in the print job is not mounted on the post-processing apparatus. Accordingly, a sheet having an image formed thereon can be prevented from being discharged without executing the designated post-processing on the sheet.

If the cancel mode is preliminarily set, the print job is cancelled immediately, which eliminates the need for the user to cancel the job.

<Display Timing of Die Replace Instruction Screen>

A third exemplary embodiment will be described below. While the first and second exemplary embodiments illustrate control processing for a single print job, the third exemplary embodiment illustrates a display timing of a die replace instruction screen when a plurality of print jobs is continuously executed.

Figure 10:
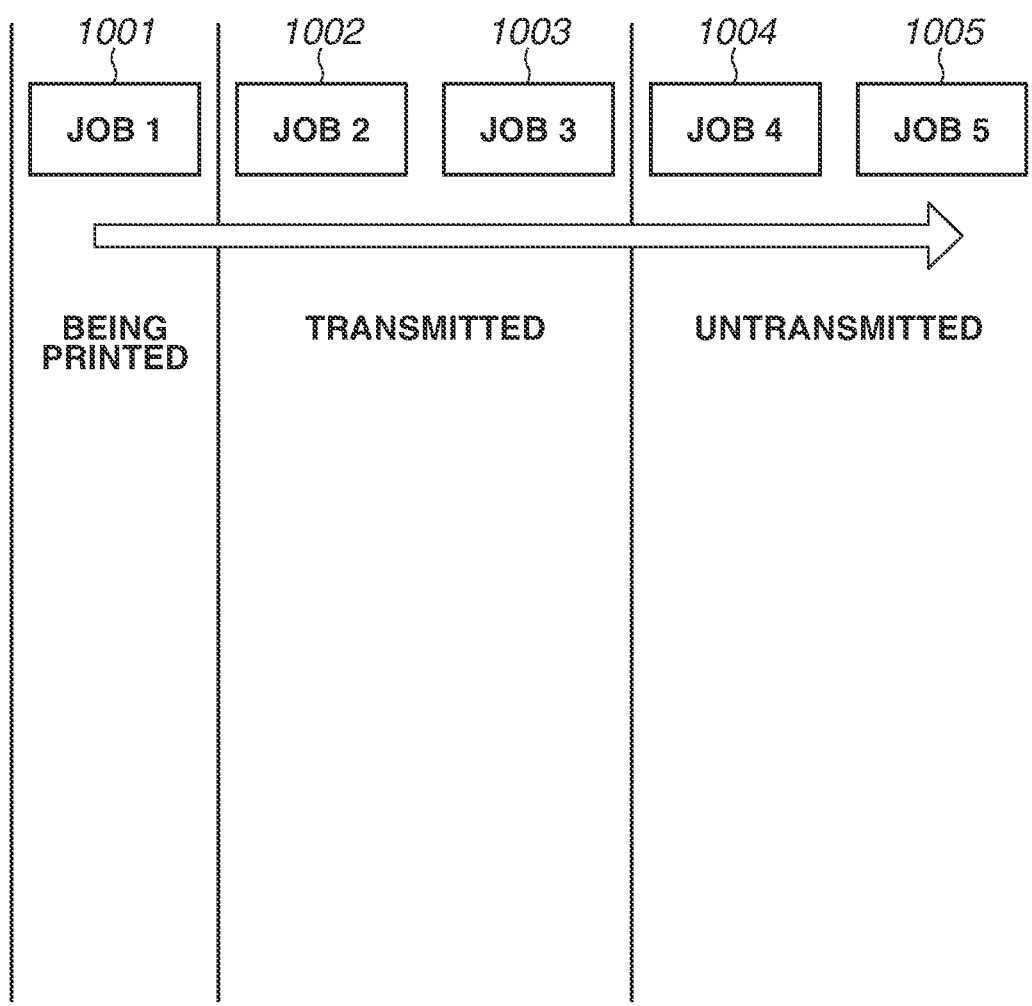
FIG. 10 is a chart illustrating a processing state of a print job.

FIG. 10 is a chart illustrating timings when the PDL controller 102 transmits a plurality of print jobs. In the present exemplary embodiment, the PDL controller 102 can continuously transmit print jobs to the image forming apparatus 103.

FIG. 10 illustrates a case where print jobs 1001 to 1005, which correspond to Job 1 to Job 5, respectively, are continuously transmitted from the PDL controller 102. Job 1 is being executed by the image forming apparatus 103, and Job 2 and Job 3 are print jobs that are already transmitted to the image forming apparatus 103 from the PDL controller 102 and retained in the memory 211 of the image forming apparatus 103.

Job 4 and Job 5 are print jobs that are not yet transmitted by the PDL controller 102 and retained in the memory 204 of the PDL controller 102.

Assume that crease processing is designated in Job 4 and the crease die is not mounted on the post-processing apparatus 104. Also assume that the PDL controller 102 controls the print jobs according to the control processing illustrated in FIG. 8.

The PDL job control module 304 of the PDL controller 102 retains information indicating whether the transmitted jobs are jobs that use the post-processing apparatus 104 until print processing is terminated.

In step S805, if the PDL job control module 304 determines that Job 4 is a job that uses the crease die and Job 1, Job 2, and Job 3 which precede Job 4 are jobs that do not use the punch die, the die replace instruction based on the message screen illustrated in FIG. 9 is displayed even when the jobs preceding Job 4 are being executed. If any one of the preceding Jobs 1 to 3 is a job that uses the punch die, the die replace instruction is displayed after the last job that uses the punch die is terminated.

Figure 11:
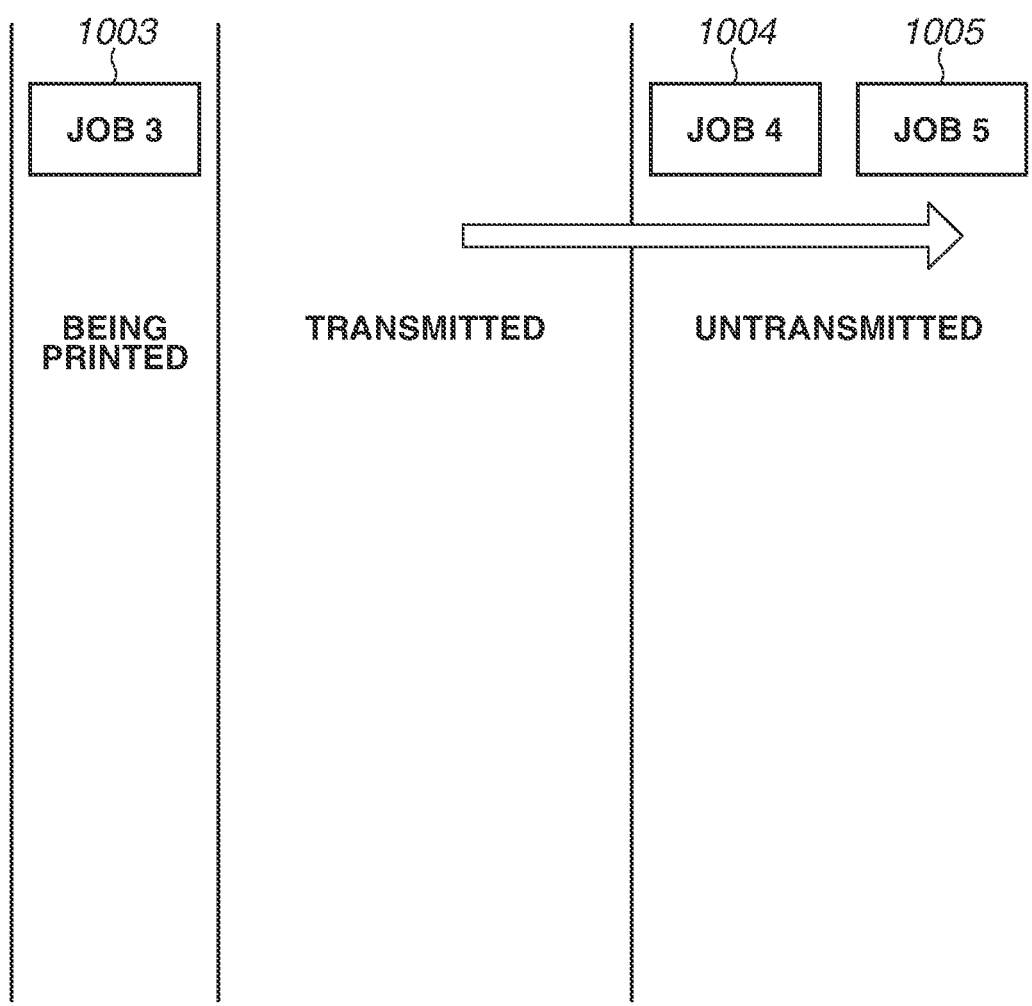
FIG. 11 is a chart illustrating the processing state of the print job.

For example, if Job 2 is a print job that uses the punch die, the die replace instruction is displayed after Job 2 is terminated. FIG. 11 illustrates the state of each job in this case.

The screen for the die replace instruction may be displayed after all the preceding print jobs are terminated. However, also in this case, if the preceding print jobs are interrupted due to, for example, paper out or paper jam during the execution of the print job, the die replace instruction screen may be displayed when the preceding print jobs include no job that uses the punch die.

According to the third exemplary embodiment, the die replace instruction is displayed before the jobs preceding the job that uses the crease die are terminated, thereby making it possible to inform the user of a timing of cancelling the print job, or a timing of replacing the die. This leads to an improvement in work efficiency.

<Control of Job Transmission Method Using Die Name (Post-Processing Device Name)>

A fourth exemplary embodiment will be described. In the fourth exemplary embodiment, a method for transmitting a print job in which punching processing is designated will be described.

As described above, the PDL controller 102 can obtain mount information indicating whether the die mounted on the post-processing apparatus 104 is the punch die or the crease die.

However, in practice, there are many types of punch dies and any punch die may be mounted. The image forming apparatus 103 cannot distinguish specific types, such as punch holes of the punch die mounted on the post-processing apparatus 104. However, the user can input the name of the punch die by using the operation unit 220 of the image forming apparatus 103, thereby enabling the post-processing apparatus control unit 308 to register information about the serial number of the mounted punch die and the input name in such a manner that the information is associated with the input name. The registered name of the punch die can be confirmed by the operation unit 220.

In the present exemplary embodiment, how to give the name of the punch die is associated with the transmission control of a print job, and the transmission of the print job is controlled based on the name of the punch die. Specifically, a job transmission control rule is defined which describes a paper size and a paper name (material) that are used in a print job, in the punch die name. The punch die name is described in the form of [control target]_[value]_[any name].

A paper size and a paper name are used as control targets. "SZ" is input when the paper size is used as a control target, and "PN" is input when the paper name is used as a control target. A specific size or name is input as a value. For example, when the name of the punch die is "SZ_A4_3H", a rule that "die replace instruction display is performed without transmitting the print job when the paper size used in the print job is other than A4 or A3" is registered as a job transmission control rule corresponding to the punch die name "SZ_A4_3H". As a control rule corresponding to a punch die name "PN_coated paper 5_22 holes", a rule that "die replace instruction display is performed without transmitting the print job when the paper name used in the print job is a name other than coated paper 5" is registered.

Figure 12:
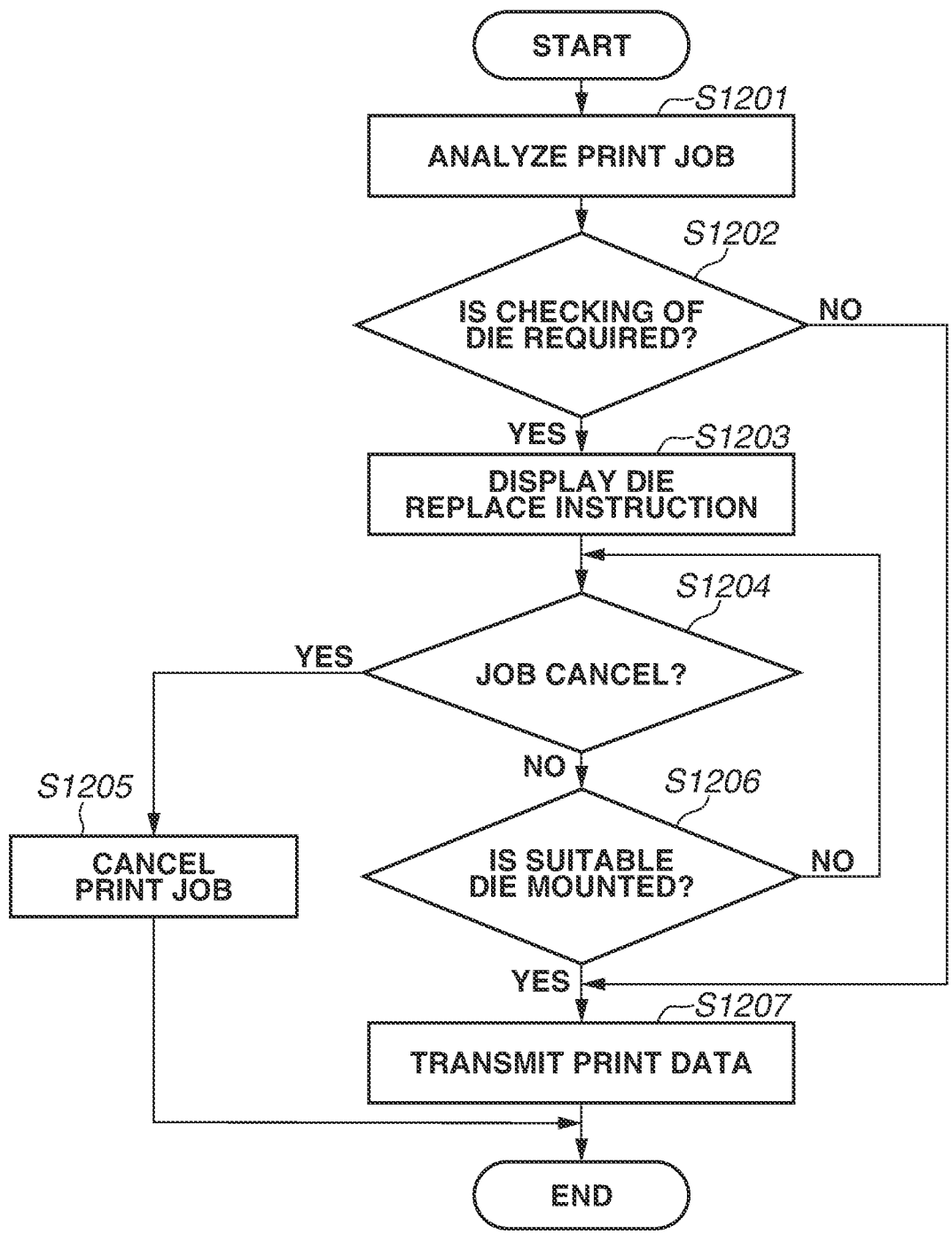
FIG. 12 is a flowchart illustrating the control method of the information processing apparatus.

FIG. 12 is a flowchart illustrating the control method of the information processing apparatus according to the present exemplary embodiment. In the present exemplary embodiment, the application 301 on the PC 101 corresponds to processing performed when the print job in which punching processing is set is received. Each step is implemented by the CPU 203 of the PDL controller 102 executing the stored control programs.

Assume that on the setting screen illustrated in FIG. 5, the print job in which "none" is set for each of the staple 502 and the crease 503 and "left" is set for the punch 504 is transmitted to the PDL controller 102. In step S1201, the PDL control module 304 analyzes the print job received by the PDL job reception module 303. In step S1202, the PDL job control module 304 determines whether it is necessary to check the die based on the type of the die mounted on the post-processing apparatus 104, the registered punch die name, and the paper size and paper name of the received print job. The PDL job control module 304 obtains, from the image forming apparatus 103, the die information about the post-processing apparatus 104 and the registered punch die name, and the PDL job control unit 304 retains the state. The timing when the PDL control module 304 obtains the die information is similar to that in the first exemplary embodiment, and the punch die name is also obtained at this time.

If the name of the die mounted on the post-processing apparatus 104 matches the die name designated in the print job and the PDL job control module 304 determines that checking of the die is not required (NO in step S1202), the processing proceeds to S1207. In step S1207, the print job transmission module 306 transmits, to the print job control module 307 of the image forming apparatus 103, the image data rasterized by the image generation module 305 based on the PDL data and the control command for the image forming apparatus. In step S1207 in FIG. 12, both the rasterized image data and the control command for the image forming apparatus are referred to as print data.

When the name of the die mounted on the post-processing apparatus 104 does not match the die name designated in the print job and the PDL job control module 304 determines that checking of the die is required (YES in step S1202), the processing proceeds to step S1203.

Figure 13:
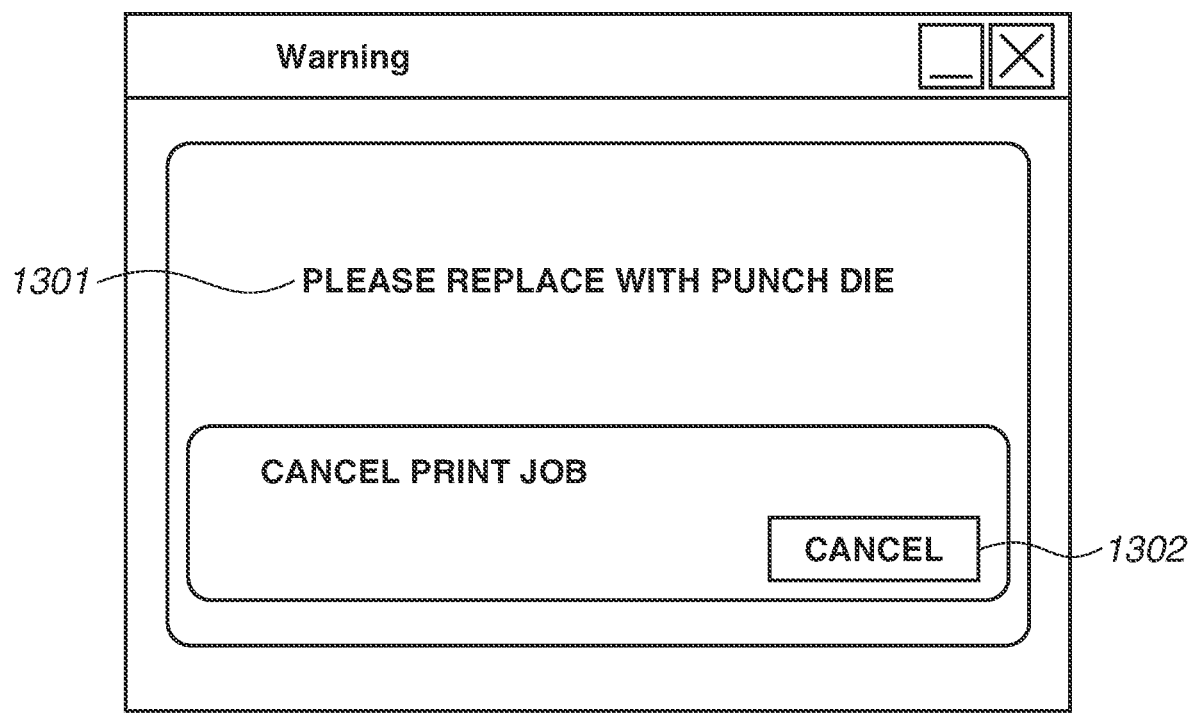
FIG. 13 is a diagram illustrating the UI screen displayed on the PC.

FIG. 13 illustrates an alarm message screen displayed on the PC 101.

On the UI screen illustrated in FIG. 13, a message 1301 prompting to replace the punch die and a cancel button 1302 for cancelling the print job are displayed.

In step S1203, the PDL job control module 304 notifies the PC 101 of the status of the "punch die replace instruction", and the PC 101 displays the message 901 prompting to replace the punch die.

In step S1204, the PDL job control module 304 determines whether the cancel button 1302 is pressed. If the PDL job control module 304 determines that the cancel button is pressed (YES in step S1204), the processing proceeds to S1205. On the other hand, if the PDL job control module 304 determines that the cancel button is not pressed (NO in step S1204), the processing proceeds to S1206.

In step S1205, the PDL job control module 304 cancels the print job, and then terminates the print processing.

In step S1206, the PDL job control module 304 determines whether the punch die that can be used in the print job is mounted on the post-processing apparatus 104. If the PDL job control module 304 determines that a suitable punch die is not mounted (NO in step S1206), the processing returns to S1204.

On the other hand, if the PDL job control module 304 determines in step S1206 that a suitable punch die is mounted (YES in step S1206), the processing proceeds to S1207. In step S1207, the print job transmission module 306 transmits, to the print job control module 307, the image data rasterized by the image generation module 305 based on the PDL data and the control command for the image forming apparatus, and the PDL job control module 304 terminates the print processing.

After that, the print job control module 307 instructs the post-processing apparatus control module 308 to perform the post-processing setting, and the post-processing control unit 309 executes the crease processing based on the instructed post-processing setting.

According to the fourth exemplary embodiment, when a print job for performing post-processing using a post-processing device with a specific post-processing device name is received, if the post-processing device having a name different from the post-processing device name is mounted on the image forming apparatus, the post-processing apparatus can be shifted to a state where the print job is cancelled or stored. Therefore, if the post-processing device designated in the print job is not mounted on the post-processing apparatus, the print data based on the received print job can be prevented from being transmitted to the image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-220401, filed Nov. 11, 2016, which is hereby incorporated by reference herein in its entirety.

What is claimed is:

1. An information processing apparatus that transmits a print job to an image forming apparatus connected to a post-processing apparatus, the post-processing apparatus being capable of mounting a replaceable post-processing device, the image forming apparatus being configured to start print processing upon receiving a print job in a state where a post-processing device corresponding to post-processing designated in the print job is mounted on the post-processing apparatus, the information processing apparatus comprising:

a receiver configured to receive information about the post-processing device from the image forming apparatus; and a controller configured to transmit the print job to the image forming apparatus when the controller determines, based on the information received by the receiver, that the post-processing device corresponding to the post-processing designated in the print job is mounted on the post-processing apparatus, and configured not to transmit the print job to the image forming apparatus when the controller determines, based on the information received by the receiver, that the post-processing device corresponding to the post-processing designated in the print job is not mounted on the post-processing apparatus.

2. The information processing apparatus according to claim 1, wherein when the controller determines that the post-processing device corresponding to the post-processing designated in the print job is not mounted on the post-processing apparatus, the controller outputs an instruction prompting to change the post-processing device.

3. The information processing apparatus according to claim 2, wherein the controller transmits the instruction to a data processing apparatus that has transmitted the print job to the information processing apparatus.

4. The information processing apparatus according to claim 2, wherein the controller transmits the print job to the image forming apparatus when the controller determines that the post-processing device corresponding to the post-processing is mounted on the post-processing apparatus after transmitting the instruction prompting to change the post-processing device.

5. The information processing apparatus according to claim 1, wherein when the controller determines that the post-processing device corresponding to the post-processing designated in the print job is not mounted, the controller outputs an instruction prompting to cancel the print job and to change the post-processing device.

6. The information processing apparatus according to claim 1, wherein the controller cancels the print job when the controller determines that the post-processing device corresponding to the post-processing designated in the print job is not mounted.

7. The information processing apparatus according to claim 1, further comprising a setting unit configured to make, when the post-processing device corresponding to the post-processing designated in the print job is not mounted, a preliminary setting for transmitting, to a data processing apparatus that has transmitted the print job to the information processing apparatus, an instruction for prompting change of the post-processing device, or for cancelling the print job without waiting for change of the post-processing device, wherein when the post-processing device corresponding to the post-processing designated in the print job is not mounted, the controller determines whether to output the instruction or cancel the print job in accordance with a content of the preliminary setting performed by the setting unit.

8. A printing system comprising:

a post-processing apparatus capable of mounting a post-processing device replaceable after a print job;

an image forming apparatus configured to start print processing in a state where a post-processing device corresponding to post-processing designated in a print job is not mounted on the post-processing apparatus; and an information processing apparatus configured to transmit a print job to the image forming apparatus, wherein the information processing apparatus comprises:
- a receiver configured to receive information about the post-processing device from the image forming apparatus; and
- a controller configured to transmit the print job to the image forming apparatus when the controller determines, based on the information received by the receiver, that the post-processing device corresponding to the post-processing designated in the print job is mounted on the post-processing apparatus, and configured not to transmit the print job to the image forming apparatus when the controller determines, based on the information received by the receiver, that the post-processing device corresponding to the post-processing designated in the print job is not mounted on the post-processing apparatus.

9. A control method of an information processing apparatus, the information processing apparatus being configured to transmit a print job to an image forming apparatus connected to a post-processing apparatus, the post-processing apparatus being capable of mounting a replaceable post-processing device, the image forming apparatus being configured to start print processing upon receiving a print job in a state where the post-processing device corresponding to the post-processing designated in the print job is not mounted on the post-processing apparatus, the control method of the information processing apparatus comprising:
- receiving information about the post-processing device from the image forming apparatus; and
- transmitting the print job to the image forming apparatus when determining, based on the received information, that the post-processing device corresponding to the post-processing designated in the print job is mounted on the post-processing apparatus, and not transmitting the print job to the image forming apparatus when determining, based on the received information, that the post-processing device corresponding to the post-processing designated in the print job is not mounted on the post-processing apparatus.

10. A storage medium storing a program for causing an information processing apparatus to execute a control method, the information processing apparatus being configured to transmit a print job to an image forming apparatus connected to a post-processing apparatus, the post-processing apparatus being capable of mounting a replaceable post-processing device, the image forming apparatus being configured to start print processing upon receiving a print job in a state where a post-processing device corresponding to post-processing designated in the print job is not mounted on the post-processing apparatus, the control method comprising:
- receiving information about the post-processing device from the image forming apparatus; and
- transmitting the print job to the image forming apparatus when determining, based on the received information, that the post-processing device corresponding to the post-processing designated in the print job is mounted on the post-processing apparatus, and not transmitting the print job to the image forming apparatus when determining based on the received information that the post-processing device corresponding to the post-processing designated in the print job is not mounted on the post-processing apparatus.

* * * * *